(12) United States Patent
Ha et al.

(10) Patent No.: US 11,602,854 B2
(45) Date of Patent: Mar. 14, 2023

(54) METHOD AND APPARATUS FOR CONTROLLING BEHAVIOR OF SERVICE ROBOT

(71) Applicant: Samsung Electronics Co., Ltd., Suwon-si (KR)

(72) Inventors: Taesin Ha, Seongnam-si (KR); Kyung-Rock Kim, Yongin-si (KR); Jun-Won Jang, Seoul (KR); Joon-Kee Cho, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 360 days.

(21) Appl. No.: 16/662,287

(22) Filed: Oct. 24, 2019

(65) Prior Publication Data
US 2020/0189117 A1 Jun. 18, 2020

(30) Foreign Application Priority Data

Dec. 18, 2018 (KR) .................. 10-2018-0164091

(51) Int. Cl.
*B25J 9/16* (2006.01)
*B25J 11/00* (2006.01)

(52) U.S. Cl.
CPC ........... *B25J 11/001* (2013.01); *B25J 9/1669* (2013.01)

(58) Field of Classification Search
CPC ...... B25J 9/1669; B25J 11/008; B25J 11/001; B25J 9/1602; B25J 9/163; B25J 9/1679; G05B 2219/39254; G05B 2219/45084
See application file for complete search history.

(56) References Cited

U.S. PATENT DOCUMENTS

| | | | | |
|---|---|---|---|---|
| 5,870,527 A | * | 2/1999 | Fujikawa | B25J 9/163 718/103 |
| 6,219,588 B1 | * | 4/2001 | Fujita | B62D 57/02 318/568.12 |
| 8,583,286 B2 | | 11/2013 | Fleischer et al. | |
| 2003/0171846 A1 | * | 9/2003 | Murray, IV | G05D 1/0088 700/258 |

(Continued)

FOREIGN PATENT DOCUMENTS

EP 2689650 A1 1/2014
KR 20170078269 A 7/2017

OTHER PUBLICATIONS

Extended European Search Report issued by the EPO dated Jun. 12, 2020 for the corresponding EP Application No. 19211831.3.

(Continued)

*Primary Examiner* — Stephen Holwerda
(74) *Attorney, Agent, or Firm* — Harness, Dickey & Pierce, P.L.C.

(57) ABSTRACT

A method and apparatus for controlling an operation of a service robot is disclosed. The method includes measuring, by processing circuitry, an evaluation index of the service robot based on sensor data in a service mode; determining, by the processing circuitry, an operation mode of the service robot from a set of at least two operation modes based on the measured evaluation index; selecting, by the processing circuitry, a behavior to be applied to the operation of the service robot from a set of at least two behaviors based on the operation mode; and controlling, by the processing circuitry, the operation of the service robot based on the behavior.

14 Claims, 10 Drawing Sheets

(56) References Cited

U.S. PATENT DOCUMENTS

| | | | |
|---|---|---|---|
| 2004/0243281 A1 | 12/2004 | Fujita et al. | |
| 2006/0184273 A1 | 8/2006 | Sawada et al. | |
| 2007/0192910 A1* | 8/2007 | Vu | B25J 19/06 901/17 |
| 2008/0009968 A1* | 1/2008 | Bruemmer | G06N 3/008 700/245 |
| 2008/0221730 A1* | 9/2008 | Sakata | G06N 3/004 700/245 |
| 2009/0082879 A1* | 3/2009 | Dooley | G05D 1/0219 700/3 |
| 2012/0209432 A1 | 8/2012 | Fleischer et al. | |
| 2013/0211591 A1 | 8/2013 | Suh et al. | |
| 2014/0336818 A1* | 11/2014 | Posselius | B25J 9/1679 700/248 |
| 2015/0005937 A1 | 1/2015 | Ponulak | |
| 2017/0120446 A1* | 5/2017 | Veltrop | B25J 11/0005 |
| 2018/0057992 A1 | 3/2018 | Cho et al. | |

OTHER PUBLICATIONS

Bozhinoski, Darko, "Managing Safety and Adaptability in Mobile Multi-Robot Systems," Proceedings of the 11th International ACM SIGSOFT Conference on Quality of Software Architectures, May 4, 2015, pp. 135-140, ACM, Montreal, QC, Canada.

\* cited by examiner

METHOD AND APPARATUS FOR CONTROLLING BEHAVIOR OF SERVICE ROBOT

CROSS-REFERENCE TO RELATED APPLICATION

This application claims under 35 U.S.C. § 119 to Korean Patent Application No. 10-2018-0164091 filed on Dec. 18, 2018, in the Korean Intellectual Property Office, the entire contents of which are incorporated herein by reference in their entirety.

BACKGROUND

1. Field

At least some example embodiments relate to service robots and/or controlling behavior of service robots.

2. Description of the Related Art

The development of intelligent or smart robots has led to the development of various types of service robots providing users with various services. The service robots include, for example, guide robots, cleaning robots, housekeeping robots, educational service providing robots, and pet caring robots, and the like. These service robots perform various tasks requiring a relatively high level of intelligence while interacting with users. They operate according to pre-programmed algorithms and perform functions defined in various situations or conditions.

SUMMARY

Some example embodiments relate to a method of controlling an operation of a service robot.

In some example embodiments, the method may include measuring, by processing circuitry, an evaluation index of the service robot based on sensor data in a service mode, determining, by the processing circuitry, an operation mode of the service robot from a set of at least two operation modes based on the evaluation index, selecting, by the processing circuitry, a behavior to be applied to the operation of the service robot from a set of at least two behaviors based on the operation mode, and controlling, by the processing circuitry, the operation of the service robot based on the behavior.

The determining of the operation mode may include changing, by the processing circuitry, a current operation mode of the service robot to another operation mode based on the evaluation index satisfying a preset operation mode change condition.

The changing of the current operation mode to the another operation mode may include changing, by the processing circuitry, the current operation mode to a higher level operation mode than the current operation mode based on the evaluation index satisfying a preset first service requirement.

The selecting of the behavior may include selecting, by the processing circuitry, the behavior from the set of at least two behaviors that are respectively associated with a function to be performed by the service robot based on the operation mode.

The set of at least two behaviors may include, for each function of the service robot, at least one rule-based behavior or at least one training-based behavior.

Other example embodiments may relate to apparatuses for controlling an operation of a service robot.

In some example embodiments, the apparatus may include a memory and a controller configured to control an operation of the service robot, for example, by executing instructions stored in the memory. In some example embodiments, the controller may be configured (for example, based on the executing of the instructions) to measure an evaluation index of the service robot based on sensor data in a service mode, determine an operation mode of the service robot from a set of at least two operation modes based on the evaluation index, select a behavior to be applied to the operation of the service robot from a set of at least two behaviors based on the operation mode, and control the operation of the service robot based on the behavior.

The controller may be configured to change a current operation mode of the service robot to another operation mode based on the evaluation index satisfying a preset operation mode change condition.

The controller may be configured to determine the operation mode of the service robot from the set of at least two operation modes to be an idle mode based on whether or not spatial data of a space in which the service robot is located is present in the idle mode.

The controller may be configured to determine the operation mode of the service robot from the set of at least two operation modes to be an exploration mode based on the spatial data not being present. The controller may be configured to control the service robot to explore the space in which the service robot is located based on the exploration mode.

The controller may be configured to determine the operation mode of the service robot from the set of at least two operation modes to be a training mode based on the spatial data being present and the evaluation index not satisfying a preset condition. The controller may be configured to control the service robot to correct parameters defining a training-based behavior of the set of at least two behaviors based on the determining of the training mode and collected traveling data.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
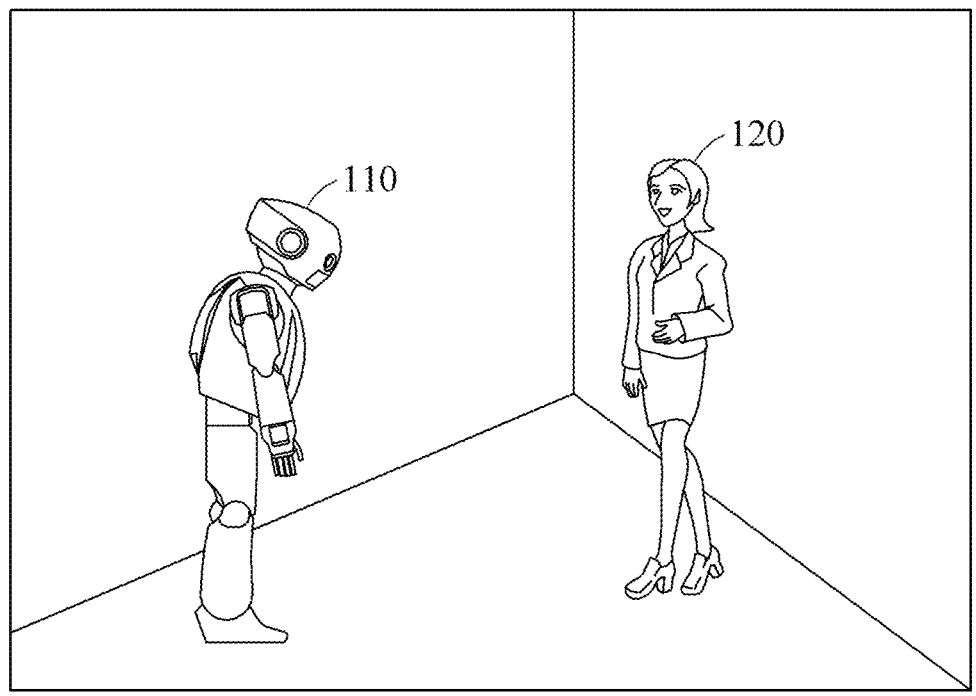
FIG. 1 is a diagram illustrating an overview of a service robot according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, some example embodiments may include modifications, equivalents, and alternatives falling within the scope of the example embodiments. Like numbers may refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms, including technical and scientific terms, used herein have the same meaning as commonly understood by one of ordinary skill in the art to which the disclosure of this application pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Various example embodiments will now be described more fully with reference to the accompanying drawings in which some example embodiments are shown. In the drawings, the thicknesses of layers and regions are exaggerated for clarity.

Hereinafter, examples will be described in detail with reference to the accompanying drawings, and like reference numerals in the drawings refer to like elements throughout.

FIG. 1 is a diagram illustrating an overview of a service robot according to at least one example embodiment.

Referring to FIG. 1, a service robot 110, a robot configured to provide a service, may move in a service area through an actuator installed in a body of the service robot 110. The service robot 110 may provide a user 120 with a service based on a purpose of use. For example, the service robot 110 may provide a route guidance service, a companion service, a direction guidance service, a facility guidance service, a hazard warning service, an advertisement service, a cleaning service, a security service, a delivery service, a cart service, and the like. The service robot 110 may provide the facility guidance service to provide an explanation of a facility and an installation to a user based on a location while following the user around. The service robot 110 may provide the route guidance service to guide a user to a destination. The service robot 110 may provide the cart service to guide a user to a location of goods the user needs or desires while following the user around with a load thereon. According to an example, the service robot 110 may receive a request for a desired service from the user 120 through an input interface, and provide the service requested by the user 120 in response to the request.

The service robot 110 may include a controller that is configured to control an operation of the service robot 110. In some example embodiments, the controller may include processing circuitry, which may include hardware such as logic circuits; a hardware/software combination, such as a processor executing software; or a combination thereof. For example, a processor may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the controller may be integrated with the service robot 110 as an apparatus; in some other example embodiments, the controller may be included in an apparatus that is different than the service robot 110, such as a computer that is in communication with the service robot 110 through a wired communication modality (e.g., a wired network such as Ethernet) and/or a wireless communication modality (e.g., a WiFi, Bluetooth, and/or cellular communication network).

The service robot 110 may provide a service through an interaction with the user 120, and may thus operate in a same space as where the user 120 is present. Thus, in addition to performance of the service robot 110, safety may also be considered. In addition, adaptability may be considered such that the service robot 110 operates smoothly in various situations or environments in which various services are provided. Due to such characteristics of the service robot 110, the service robot 110 may behave differently from other industrial robots or autonomous driving vehicles for which an incorrect or erroneous behavior is not allowed.

The service robot 110 may be capable of performing a behavior selected from a set of at least two behaviors. Each behavior, or a behavior pattern, of a robot may be broadly classified as a rule-based behavior and/or as a training-based behavior. The rule-based behavior indicates a behavior pattern that is predefined based on a situation, and the training-based behavior indicates a behavior pattern that is changeable based on a situation through training. For industrial robots or autonomous driving vehicles, safety may be ensured and they may thus operate (e.g., mostly, preferably, and/or by default) based on the rule-based behavior. However, a rule-based behavior may have limitation in terms of performance; for example, it may not be optimized for various situations although it may provide a certain or higher level of initial performance. In contrast, a training-based behavior may have performance improved through optimization, although its initial performance may not be as good as that of the rule-based behavior and may thus be relatively less usable.

In some example embodiments, the service robot 110 may continuously improve its performance through training while providing a service of a certain or higher level of quality, and the rule-based behavior and the training-based behavior may be used together (e.g., in a concurrent and/or consecutive manner). According to at least one example embodiment to be described hereinafter, an operation mode of the service robot 110 may be determined by processing circuitry from a set of at least two operation modes based on sensor data collected from a sensor, and a desired behavior or behavior pattern may be selected by the processing circuitry from a set of at least two behaviors or behavior patterns based on the operation mode. For example, a behavior to be applied to an operation of the service robot 110 may be selected from a set of at least two behaviors that includes at least one rule-based behavior and at least one training-based behavior based on the operation mode. For example, the processing circuitry may be configured to control the service robot 110 by initially selecting a rule-based behavior from the set of at least two behaviors, and improving performance of the training-based behavior using collected data while providing a service. When performance of the training-based behavior is improved, the processing circuitry may be configured to change (e.g., replace) the rule-based behavior to the training-based behavior. As described above, the service robot 110 may perform an operation that is optimized for a situation, and/or may continuously improve performance through training while providing a service.

To select such a desired behavior of the service robot 110, the processing circuitry may be configured to measure an evaluation index of the service robot 110, for example, based on sensor data. The processing circuitry may be configured use this evaluation index to determine an operation mode of the service robot 110, and the service robot 110 may operate based on a behavior of the set of at least two behaviors that corresponds to the operation mode. According to at least one example embodiment, the processing circuitry may be configured to control the service robot 110 by measuring the evaluation index in real time, and to change an operation mode of the service robot 110 to another operation mode of the set of at least two operation modes based on a service situation in which a service is provided based on the measured evaluation index. Based on the another operation mode, the processing circuitry may be configured to select a behavior from the set of at least two behaviors to be applied to the operation of the service robot 110. Herein, the set of at least two behaviors may include a subset of behaviors or behavior patterns that are associated with a same function, and the subset may include at least one rule-based behavior and/or at least one training-based behavior. That is, the processing circuitry may be configured to control the service robot 110 by selecting, from the set of at least two behaviors, a behavior that corresponds to the operation mode from the rule-based behavior and the training-based behavior, and to cause the service robot 110 to perform the function based on the selected behavior.

The control of a service robot including the determination of an operating mode and a selection of a behavior by processing circuitry such as disclosed herein may, in some scenarios, provide some advantages in the control of the service robot. As a first example, the selection of an operating mode by processing circuitry may enable the service robot to change between a rule-based mode, which may provide a higher confidence of safe operation but may exhibit lower adaptability to dynamic circumstances, and a training-based mode, which may exhibit higher adaptability to dynamic circumstances but a lower confidence of safe operation. As a second example, an automated selection of an operating mode and/or a behavior by processing circuitry may enable the service robot to adjust automatically a performance level (e.g., a quality of completing a function or task), a speed (e.g., a speed of completing the function or task), and/or a safety level (e.g., the safety of completing a function or task) based on the circumstances, such as the presence or absence of individuals or the nature of the requested service task. As a third example, automatically switching the service robot between a rule-based mode and a training-based mode may enable the processing circuitry to cause the service robot to train (for instance, training a machine learning technique) to perform functions of a service operation while also performing the service operation in a different manner, such as according to a rule-based operating mode.

Hereinafter, a method of controlling an operation of a service robot (hereinafter simply referred to as an operation control method) that includes determining, by the processing circuitry, an operation mode from the set of at least two operation modes and selecting, by the processing circuitry, a behavior from the set of at least two behaviors will be described in greater detail.

Figure 2:
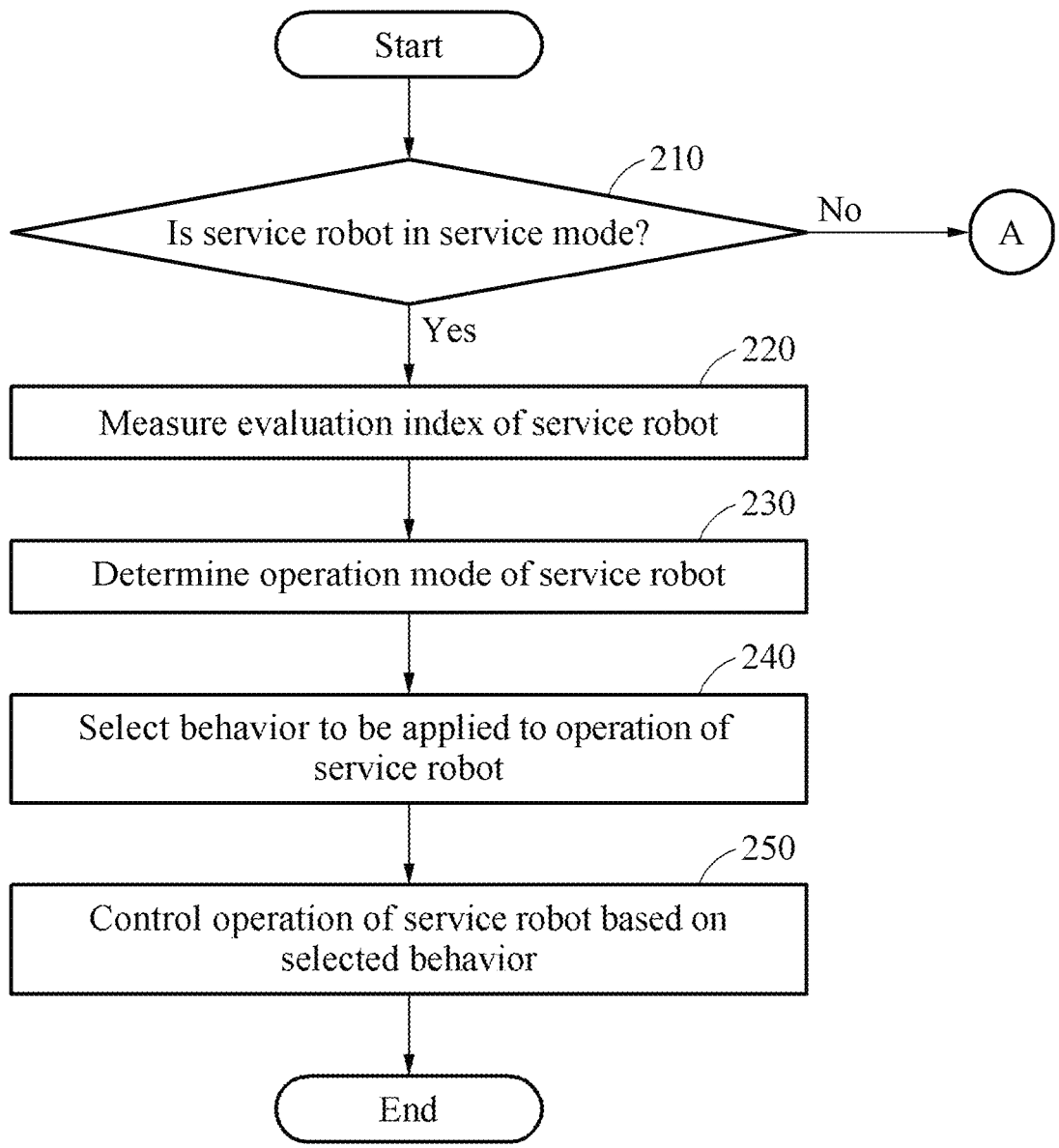
FIG. 2 is a flowchart illustrating an example of an operation control method of a service robot in a service mode according to at least one example embodiment.

FIG. 2 is a flowchart illustrating an operation control method of a service robot in a service mode according to at least one example embodiment. In some example embodiments of FIG. 2 and the example methods shown in other figures presented herein, the operation control method may be performed by processing circuitry of an operation control apparatus, such as a controller included in an apparatus for controlling an operation of a service robot (hereinafter simply referred to as an operation control apparatus). In some other example embodiments of FIG. 2 and the example methods shown in other figures presented herein, the operation control method may be encoded as computer readable instructions on a non-volatile computer-readable medium, such that execution of the instructions by the processing circuitry may cause the operation control apparatus to perform the operation control method.

Referring to FIG. 2, in operation 210, the processing circuitry of the operation control apparatus determines whether or not an operation mode that has been determined for a service robot is a service mode. According to at least one example embodiment, the set of at least two operation modes of the service robot may include the service mode in which the service robot performs a service providing function and/or an idle mode in which the service robot does not perform the service providing function. When the operation mode determined for the service robot from the set of at least two operation modes is not the service mode, the processing circuitry of the operation control apparatus may control the service robot to operate in the idle mode, an example of which is to be described in detail with reference to FIG. 3. For example, in a situation in which a service is not currently provided is recognized or when there is no request for a service, the processing circuitry may control the service robot by determining the idle mode as the operating mode. Based on the operation mode of the service robot being determined to be the service mode, the processing circuitry of the operation control apparatus may perform operations 220 through 250 to be described hereinafter.

In operation 220, the processing circuitry of the operation control apparatus measures an evaluation index of the service robot based on sensor data obtained by a sensor. The evaluation index indicates a value that numerically represents a result of evaluation performed on an operation of the service robot based on the sensor data. For example, the processing circuitry of the operation control apparatus may measure a performance index, a safety index, or an adaptability index of the service robot, or a set or combination of such indices. The performance index may indicate a speed and/or accuracy of the service robot. The safety index may indicate a level of safety and/or reliability of the service robot. The adaptability index may indicate adaptability and/or robustness of the service robot. The control circuitry may measure such evaluation index in real time, and may use the measured evaluation index to determine whether to change the operation mode of the service robot.

In some example embodiments, the processing circuitry of the operation control apparatus may measure the performance of the service robot based on how rapidly or accurately the service robot performs a desired operation. In some example scenarios, the service robot may operate in an environment where a user is also present, and thus safety indicating whether the service robot is safe to the user may be considered. Further, adaptability of the service robot may be considered such that the service robot operates smoothly in various and continuously changing environments. Thus, to provide a desired service to a user in various situations, the service robot may operate flexibly according to a change in environment. In some example embodiments, the control circuitry of the operation control apparatus may measure and/or use any, several, or all the three aspects—performance, safety, and adaptability—for the service robot in various situations and environments.

In some example embodiments, the service robot may include various sensors, for example, a camera, a depth sensor, a distance sensor, a global positioning system (GPS) sensor, a microphone, a light detection and raging (LiDAR) sensor, a motor encoder sensor, an infrared sensor, an inertial measurement unit (IMU), an odometer sensor, and the like. The processing circuitry of the operation control apparatus may be configured to measure an evaluation index based on sensor data output from these sensors, and perform context awareness. For example, the processing circuitry of the operation control apparatus may be configured to utilize and/or exhibit context awareness as an indicator of recognizing a situation as described above.

According to at least one example embodiment, the processing circuitry of the operation control apparatus may be configured to recognize a current service situation in real time based on sensor data, and to measure an evaluation index based on a result of recognizing the service situation and the sensor data. Herein, the processing circuitry of the operation control apparatus may select a different evaluation index based on each service situation.

In operation 230, the control circuitry of the operation control apparatus determines an operation mode of the service robot from a set of at least two operations, wherein the determination is based on the evaluation index measured in operation 220. For example, the set of at least two he operation modes of the service robot may include at least one of a safe mode, a normal mode, and/or an advanced mode, and the processing circuitry of the operation control apparatus may be configured to determine the operation mode of the service robot from the set of at least two operation modes to be one of the safe mode, the normal mode, and the advanced mode based on the evaluation index. The safe mode may be an operation mode enabling a stable and continuous provision of a service, which may have a lower performance compared to other operation modes, such as a normal mode and an advanced mode. The normal mode may be an operation mode that ensures or promotes a certain (or general) level of performance, safety, and/or adaptability. The advanced mode may be an operation mode with a relatively better performance compared to operation modes, such as a safe mode and a normal mode, although it may not be verified in terms of safety and adaptability.

In some example embodiments, the processing circuitry of the operation control apparatus may be configured to determine the operation mode from the set of at least two operation modes based on the current service situation and the evaluation index. According to at least one example embodiment, the processing circuitry of the operation control apparatus may be configured to initially operate the service robot in the safe mode and/or the normal mode, and/or to change the operation mode based on changes in the service situation and/or the measured evaluation index. For example, an operation mode change condition may be preset for each service situation, and the processing circuitry of the operation control apparatus may be configured to change a current operation mode of the service robot to another operation mode based on the evaluation index satisfying the operation mode change condition. In this example, when the processing circuitry of the operation control apparatus determines that the evaluation index satisfies a preset first service requirement, the processing circuitry of the operation control apparatus may be configured to change the current operation mode to a higher level operation mode than the current operation mode. For example, based on the current operation mode being the safe mode, the processing circuitry of the operation control apparatus may be configured to change the safe mode to the normal mode; and/or based on the current operation mode being the normal mode, the processing circuitry of the operation control apparatus may be configured to change the normal mode to the advanced mode. As another example, based on the evaluation index not satisfying a preset second service requirement, the processing circuitry of the operation control apparatus may be configured to change the current operation mode to a lower level operation mode than the current operation mode. For example, based on the current operation mode being the advanced mode, the processing circuitry of the operation control apparatus may change the advanced mode to the normal mode; and/or based on the current operation mode being the normal mode, the processing circuitry of the operation control apparatus may change the normal mode to the safe mode.

In operation 240, the processing circuitry of the operation control apparatus selects a behavior to be applied to an operation of the service robot from a set of at least two behaviors based on the operation mode, wherein the selection is determined in operation 230. A behavior or behavior pattern may define a detailed operation strategy of the service robot, and a corresponding behavior may be associated with each function and/or each operation mode of the service robot. The set of behaviors may include at least two behaviors performing a same function, and the processing circuitry of the operation control apparatus be configured to select the behavior from a set of at least two behaviors including, for example, a rule-based behavior and a training-based behavior, which may be the same, similar, and/or different in terms of performance, safety, and/or adaptability. The rule-based behavior may form an operation to be performed by the service robot according to a predefined behavior. The processing circuitry of the operation control apparatus may be configured to update the training-based behavior continuously through training, for example, to improve, maintain, verify, and/or update the performance of the service robot during an operation mode, while exhibiting a behavior, and/or while performing a function.

In some example embodiments, the training may involve a machine learning model of the service robot and/or an operation control apparatus. For example, the processing circuitry of an operation control apparatus may perform some operations by artificial intelligence and/or machine learning, including deep learning, as part of a training-based operating mode of the service robot. The training may include, for example, learning to identify a need for a service function based on sensor input, such as video surveillance of an environment of the service robot, and/or based on an interaction with a user; learning to prioritize among and/or schedule multiple service functions that may be performed by the service robot; learning to determine an operating mode and/or select a behavior from the set of at least two behaviors to perform a service function; learning to complete a requested service function; learning to evaluate a quality of a service function being performed or having been completed by the service robot in an operating mode and/or a behavior; and/or learning to detect an operating mode change condition and/or a behavior change condition; learning to change from a current operating mode to another operating mode of the set of at least two operating modes; and/or learning to change from a current behavior to another behavior of the set of at least two behaviors.

In some example embodiments, the processing circuitry may include an artificial neural network that is trained on a set of training data by, for example, a supervised, unsupervised, and/or reinforcement learning model, and wherein the processing circuitry may process a feature vector to provide output based upon the training. Such artificial neural networks may utilize a variety of artificial neural network organizational and processing models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM). Alternatively or additionally, the processing circuitry may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

In some example embodiments, processing circuitry of the operation control apparatus may be configured to select a behavior based on a function, for example, a traveling function, a tracking function, and/or an obstacle avoiding function, wherein the behavior is selected from the set of at least two behaviors based on a current service situation, and/or a determined operation mode. For example, the processing circuitry of the operation control apparatus may be configured to select the behavior from the set of at least two behaviors based on the operation mode, wherein the behavior is associated with a function to be performed by the service robot. For example, based on the service robot is perform the traveling function and the operation mode of the service robot being determined to be a first operation mode, for example, the safe mode, the processing circuitry of the operation control apparatus may be configured to select a first rule-based behavior from the set of at least two behaviors. As another example, based on the service robot performing the same traveling function and the operation mode of the service robot being determined to be a second operation mode, for example, the normal mode, the processing circuitry of the operation control apparatus may be configured to select a second rule-based behavior. Based on the service robot performing the same traveling function and the operation mode of the service robot being determined to be a third operation mode, for example, the advanced mode, the processing circuitry of the operation control apparatus may be configured to select a training-based behavior. As described above, although the service robot performs a same function based on a service situation, the processing circuitry of the operation control apparatus may be configured to change the behavior of the service robot on an operation mode. For example, the first rule-based behavior may provide a higher level of safety and adaptability compared to the second rule-based behavior, for example, a certain (or general) level of safety and adaptability. However, the first rule-based behavior may have a relatively lower level of performance than that of the second rule-based behavior. The training-based behavior may have a performance that is improved continuously through training.

In operation 250, the processing circuitry of the operation control apparatus controls an operation of the service robot based on the behavior selected in operation 240. For example, the processing circuitry of the operation control apparatus may be configured to control the service robot to perform a function based on the selected behavior. Subsequently, the processing circuitry of the operation control apparatus may be configured to repeatedly perform operations 210 through 250. For example, based on the service robot operating in a service mode, the processing circuitry of the operation control apparatus may be configured to measure an evaluation index in real time, and to change an operation mode of the service robot to a different operation mode of the set of at least two operation modes, such that the service robot may perform its operation with an optimal performance for a required quality of service. As another example, the processing circuitry of the operation control apparatus may be configured to change the operation mode to a different operation mode of the set of at least two operation modes based on a service situation at a time at which a service is provided. The processing circuitry of the operation control apparatus may then be configured to select a behavior from the set of at least two behaviors based on a function to be performed by the service robot and the changed operation mode. As the service robot continues providing the service, performance of a training-based behavior and an operation mode using this behavior may be gradually improved.

Through the operations described above with reference to FIG. 2, by controlling the service robot to perform an operation ensuring performance in a predefined service situation, and improving the performance through a training-based behavior performed in a service providing process, the processing circuitry of the operation control apparatus may control the service robot to perform an operation providing a required performance even in a service situation that is not predefined.

Figure 3:
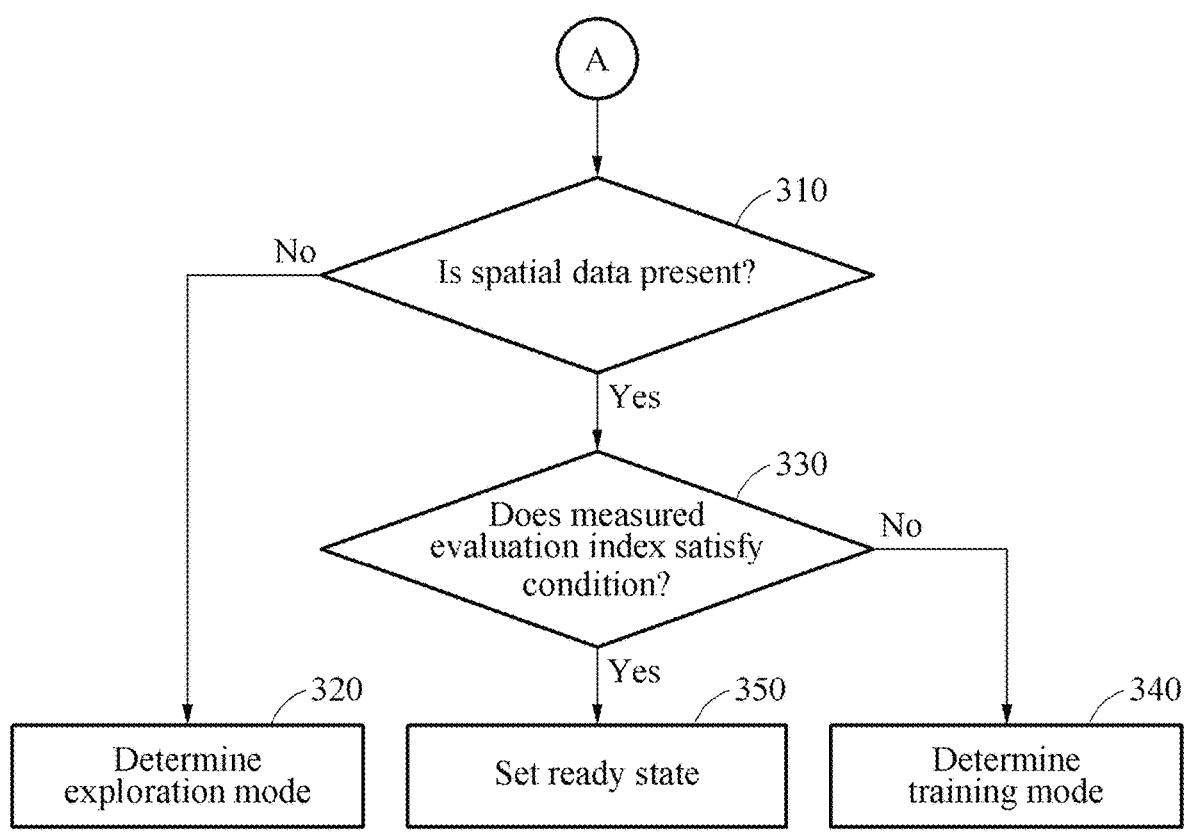
FIG. 3 is a flowchart illustrating an example of an operation control method of a service robot in an idle mode according to at least one example embodiment.

FIG. 3 is a flowchart illustrating an operation control method of a service robot in an idle mode according to at least one example embodiment.

Referring to FIG. 3, in operation 310, the processing circuitry of an operation control apparatus determines whether or not spatial data of a space in which a service robot is located is present. Based on whether or not the spatial data is present, the processing circuitry of an operation control apparatus may determine an operation mode of the service robot from the set of at least two operation modes to be an idle mode. The spatial data may include, for example, map data, data on structures of facilities and installations, and the like.

In operation 320, based on the spatial data not being present (for example, based on the service robot not having information on the space in which the service robot is located), the processing circuitry of the operation control apparatus determines the operation mode of the set of at least two operation modes to be an exploration mode. For example, based on the service robot operating in the exploration mode, the processing circuitry of an operation control apparatus may cause the service robot to explore the space in which the service robot is located and to collect spatial data as a result of the exploring.

In operation 330, based on the spatial data being present, the processing circuitry of the operation control apparatus determines whether or not a measured evaluation index satisfies a preset condition. For example, the processing circuitry of the operation control apparatus may be configured to determine whether a measured performance index satisfies a service requirement.

In operation 340, based on the evaluation index not satisfying the condition, the processing circuitry of the operation control apparatus determines the operation mode of the service robot of the set of at least two operation modes to be a training mode. For example, based on the service robot operating in the training mode, the processing circuitry of the operation control apparatus may be configured to correct parameters defining a training-based behavior based on data collected up to a current point in time.

In operation 350, based on the evaluation index satisfying the condition, the processing circuitry of the operation control apparatus determines the operation mode of the service robot from the set of at least two operation modes to be in a ready operation mode. For example, the service robot set in the ready operation mode may receive an external input to operate in the service mode, or wait until a situation requiring the provision of a service is recognized.

Figure 4:
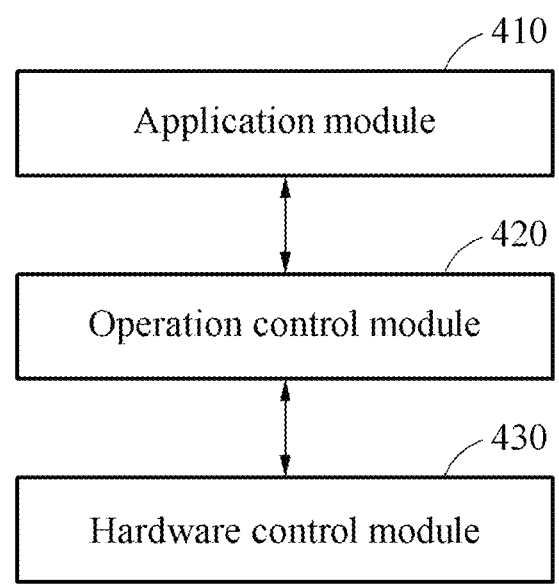
FIG. 4 is a diagram illustrating an example of an operation control module configured to perform an operation control method according to at least one example embodiment.

FIG. 4 is a diagram illustrating an operation control module configured to perform an operation control method according to at least one example embodiment.

Referring to FIG. 4, processing circuitry of an operation control module 420 that is configured to control an operation of a service robot may operate through interaction with an application module 410 (which, for example, may also be part of the processing circuitry) that is configured to control an application operation of the service robot and/or a hardware control module 430 (which, for example, may also be part of the processing circuitry) that is configured to control hardware of the service robot. The operation control module 420 of the processing circuitry may be included in an operation control apparatus described herein. According to at least one example embodiment, the application module 410 of the processing circuitry may be configured to send, to the operation control module 420 of the processing circuitry, a driving command of the service robot. The operation control module 420 of the processing circuitry may be configured to send, to the application module 410 of the processing circuitry, driving state information of the service robot. The hardware control module 430 of the processing circuitry may be configured to send, to the operation control module 420 of the processing circuitry, sensor data measured by a sensor of the service robot, for example, pose information, movement information, odometry information, image information, distance information, and the like. The operation control module 420 of the processing circuitry may be configured to send, to the hardware control module 430 of the processing circuitry, a command to control a speed, a pose, and the like of the service robot.

The operation control module of the processing circuitry may be configured to change an operation mode of the service robot, such as selecting another operation mode from the set of at least two operation modes, and/or to select a behavior from the set of at least two behaviors. When a behavior changes, the operation control module of the processing circuitry may be configured to send, to the hardware control module of the processing circuitry, an execution command that instructs the service robot to suspend a previously performed behavior and perform a new behavior. When the hardware control module of the processing circuitry receives the execution command, the hardware control module of the processing circuitry may be configured to change the behavior of the service robot (for example, to select a different behavior than a current behavior from the set of at least two behaviors), to cause the service robot to perform the behavior instructed by the operation control module of the processing circuitry, and/or to feed back to the operation control module of the processing circuitry information on a state of the service robot.

According to at least one example embodiment, the operation control module of the processing circuitry may be configured to select one behavior from the set of at least two behaviors based on an evaluation index required for each situation (for example, the behavior having a highest performance among the set of at least two behaviors), and/or send, to the service robot, an execution command instructing the service robot to perform the selected behavior.

According to other example embodiments, each behavior may be associated with a separate behavior module of the processing circuitry that causes the service robot to perform the behavior. For example, the first behavior module of the processing circuitry may configured to perform a training-based behavior, and a second behavior module of the processing circuitry may be configured to perform a rule-based behavior. In some example embodiments, behavior modules of the processing circuitry may be controlled by the operation control module of the processing circuitry, and/or may be configured to send information generated by the service robot involving a performance of a behavior to the operation control module of the processing circuitry. In some example embodiments, the operation control module of the processing circuitry may be configured to control execution and/or termination of the behavior module of the processing circuitry, and/or one or more behavior modules of the processing circuitry may be configured to control a behavior of the service robot under the control of the operation control module of the processing circuitry. In some example embodiments, a behavior module of the processing circuitry that is configured to perform the training-based behavior may include a training interface for training of the training-based behavior. The operation control module of the processing circuitry may be configured to control training of the training interface. For example, the operation control module of the processing circuitry may be configured to control initiation and/or suspension of the training, and/or initiation and/or suspension of collecting data for the training.

Figure 5:
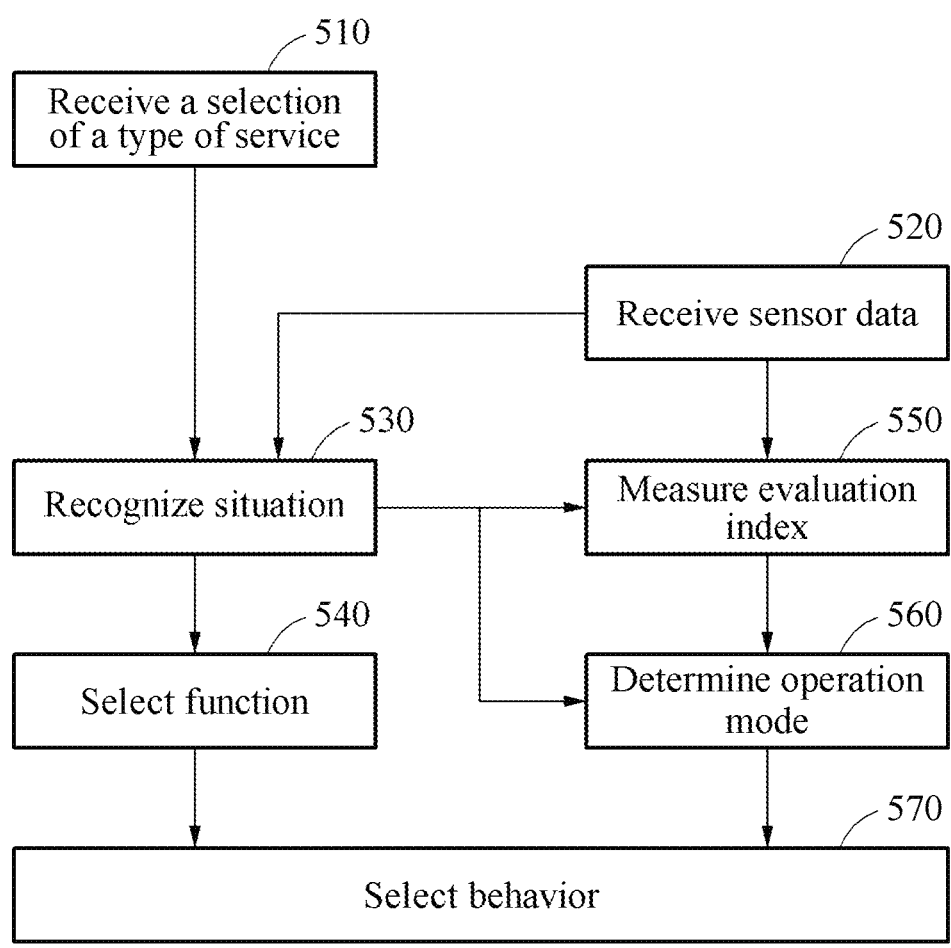
FIGS. 5 through 7 are diagrams illustrating examples of an operation control method of a service robot in a service mode according to at least one example embodiment.

FIG. 5 is a diagram illustrating an example of an operation control method of a service robot in a service mode according to at least one example embodiment.

Referring to FIG. 5, in operation 510, the processing circuitry may receive (for example, from a user) a selection of a type of service to be received from and/or performed by a service robot. For example, the processing circuitry may receive, from the user, a selection of a desired service to be received from the service robot, for example, a cart service, a route guidance service, and/or an artwork guidance service. In some example scenarios, operation 510 may be omitted.

In operation 520, the processing circuitry of an operation control apparatus receives sensor data output from a sensor of the service robot.

In operation 530, the processing circuitry of the operation control apparatus recognizes a situation, or performs context recognition, based on the type of the service to be provided by the service robot and the received sensor data.

In operation 540, the processing circuitry of the operation control apparatus selects a function to be performed based on the recognized situation, for example, a traveling function, an obstacle avoiding function, a tracking function, and the like. Herein, the processing circuitry may determine (for example, in advance) a function for each situation based on a service to be performed by the service robot.

In operation 550, the processing circuitry of the operation control apparatus measures an evaluation index based on the sensor data. For example, the processing circuitry of the operation control apparatus may be configured to measure (for example, in real time) a performance index, a safety index, and/or an adaptability index based on outputs of various sensors. The evaluation index to be measured may vary based on a type of service to be provided by the service robot and/or a situation in which the service robot operates. For example, an evaluation index requirement may vary for each service.

In operation 560, the processing circuitry of the operation control apparatus determines an operation mode of the service robot based on the evaluation index. For example, the processing circuitry of the operation control apparatus may be configured to determine a current operation mode of the service robot based on a contextual requirement, for example, a requirement for each service situation, and/or to determine whether to change the current operation mode to a different operation mode of the set of at least two operation modes. According to at least one example embodiment, based on the measured evaluation index satisfying the requirement, the processing circuitry of the operation control apparatus may be configured to change the current operation mode to another operation mode of the set of at least two operating modes that provides a higher level of performance. As another example, based on the measured evaluation index not satisfying the requirement, the processing circuitry of the operation control apparatus may be configured to change the current operation mode to another operation mode of the set of at least two operating modes that provides a higher level of safety or adaptability.

In operation 570, the processing circuitry of the operation control apparatus selects a behavior of the service robot from the set of at least two behaviors based on the function to be performed by the service robot and the operation mode determined in operation 560. In some example embodiments, at least one behavior of the set of at least two behaviors may be defined for each function of the service robot, and the processing circuitry of the operation control apparatus may be configured to select a behavior from the set of at least two behaviors that corresponds to the determined operation mode from the at least one behavior. The service robot may then generate or perform an operation based on the selected behavior.

As described above, the processing circuitry of the operation control apparatus may be configured to evaluate (for example, in real time) a current operation of the service robot based on a service situation, and/or to determine an operation and/or a behavior of the service robot based on a result of the evaluating. Thus, the processing circuitry of the operation control apparatus may cause the service robot to exert an optimal level of performance in various situations.

Figure 6:
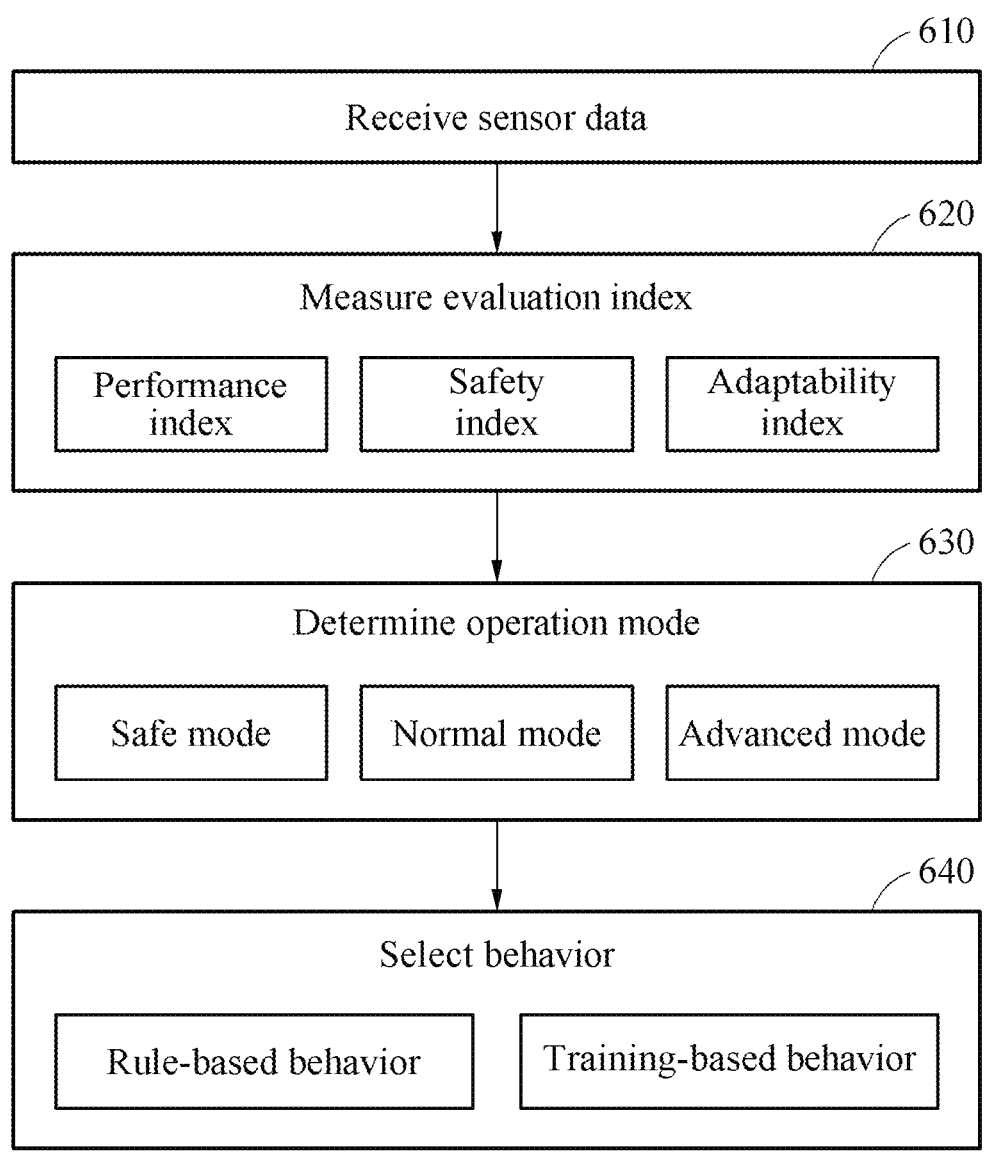

FIG. 6 is a diagram illustrating an example method of selecting a behavior pattern of a service robot according to at least one example embodiment.

Referring to FIG. 6, in operation 610, processing circuitry of an operation control apparatus may receive sensor data, which may have been obtained, for example, from various sensors included in a service robot.

In operation 620, the processing circuitry of the operation control apparatus measures an evaluation index based on the sensor data. For example, the processing circuitry of the operation control apparatus may be configured to measure at least one of a performance index, a safety index, or an adaptability index, or a combination thereof, based on a service situation. For example, the processing circuitry of the operation control apparatus may be configured to use the performance index to measure a speed and accuracy of the service robot, which may be based on an average function performing speed, a maximum speed, an average performing speed, a minimum performing speed, a function performing error rate, a tracking error rate, and the like. The processing circuitry of the operation control apparatus may be configured to calculate the performance index based on a weighted sum of these and/or other elements. The processing circuitry of the operation control apparatus may be configured to use the safety index to measure a level of safety and/or reliability of the service robot, which may be based on the number of collisions while performing a function, a speed at a time of collision, a collision time, a probability of a collision (or a distance from an object), how many times a location/speed/torque limit is reached while performing a function and what time such a limit is reached, and the like. The processing circuitry of the operation control apparatus may be configured to calculate the safety index based on a weighted sum of these and/or other elements. The processing circuitry of the operation control apparatus may be configured to use the adaptability index to measure a level of adaptability and/or robustness of the service robot, which may be based on the number of context recognitions, the number of situational response strategies, a degree of a change in performance and safety occurring when a situation changes, and the like. The processing circuitry of the operation control apparatus may be configured to calculate the adaptability index based on a weighted sum of these and/or other elements.

In operation 630, the processing circuitry of the operation control apparatus determines an operation mode of the service robot from the set of at least two operation modes based on the evaluation index. The set of at least two operation modes may include, for example, a safe mode, a normal mode, and/or an advanced mod. The processing circuitry of the operation control apparatus may be configured to select the operation mode from a set including these three operation modes based on a service requirement, the measured evaluation index, and/or a service situation.

In operation 640, the processing circuitry of the operation control apparatus selects a behavior from the set of at least two behaviors to be applied to the service robot based on the determined operation mode. For example, the processing circuitry of the operation control apparatus may select the behavior to be applied to the service robot from a set of behaviors or behavior patterns having different behavioral strategies for a same function. For example, as a behavior to perform a traveling function, the set of at least two behaviors may include a rule-based behavior and a training-based behavior. In some example embodiments, behaviors included in the set may provide different levels of performance, safety, and/or adaptability. For example, the set may include a behavior corresponding to each operation mode, and the processing circuitry of the operation control apparatus may select a behavior corresponding to the determined operation mode to be applied to the service robot. For example, based on the operation mode being determined to be the safe mode or the normal mode, the processing circuitry of the operation control apparatus may select a rule-based behavior; and/or based on the operation mode being determined to be the advanced mode, the processing circuitry of the operation control apparatus may select a training-based behavior.

Figure 7:
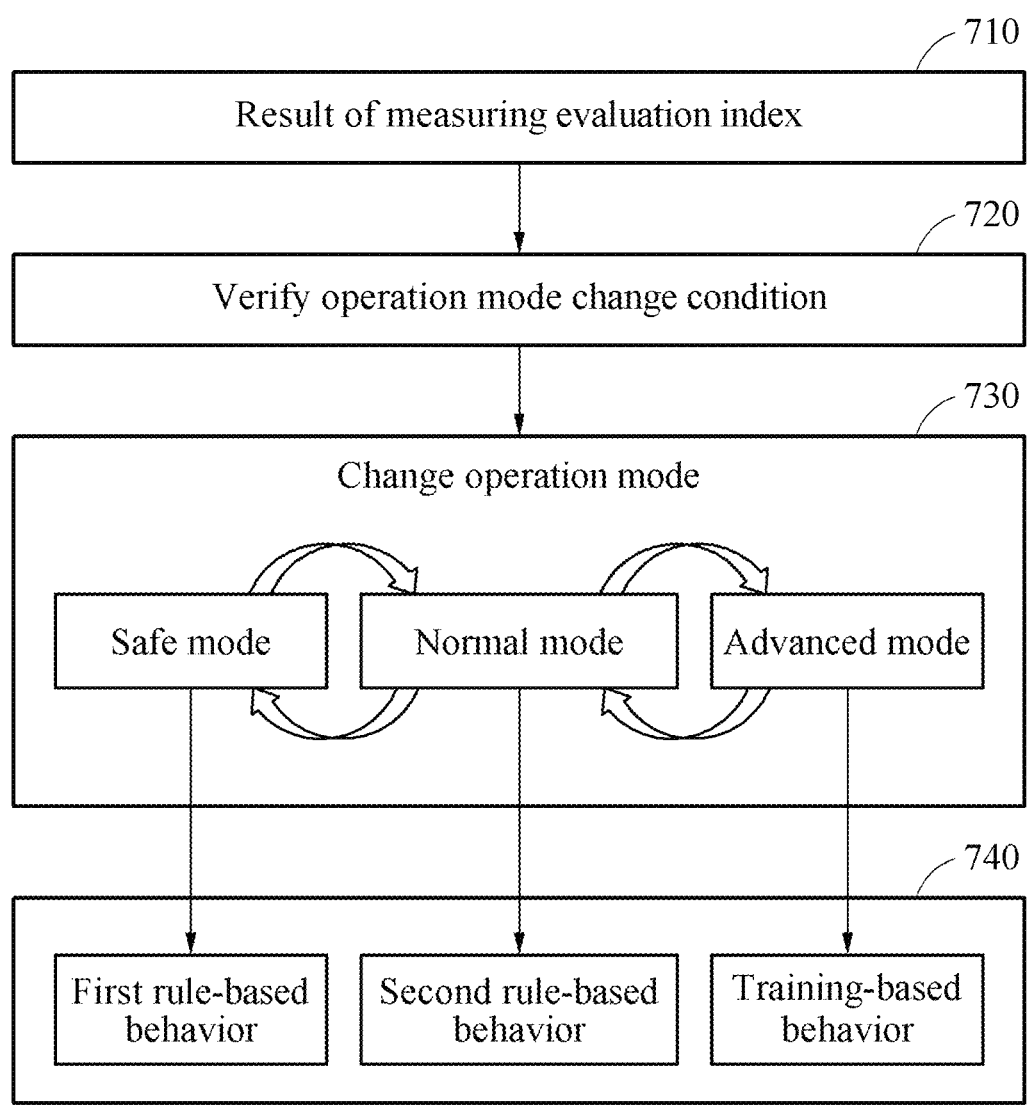

FIG. 7 is a diagram illustrating an example of a change in operation mode and a change in behavior in response to the change in operation mode according to at least one example embodiment.

Referring to FIG. 7, in operation 720, processing circuitry of an operation control apparatus verifies an operation mode change condition based on a result 710 of measuring an evaluation index. The processing circuitry of the operation control apparatus may be configured to measure the evaluation index (for example, in real time) based on sensor data, and/or based on time.

In operation 730, based on the evaluation index satisfying the operation mode change condition, the processing circuitry of the operation control apparatus changes a current operation mode of a service robot to another operation mode of the set of at least two operation modes. The operation mode change condition may include, for example, a condition for increasing performance of the service robot and/or a condition for increasing safety, based on a service situation.

For example, based on the measured evaluation index satisfying a preset first service requirement for performance, the processing circuitry of the operation control apparatus may be configured to change the operation mode to a higher level operation mode of the set of at least two operation modes, for example, to increase performance of the service robot. In this example, based on the current operation mode being a safe mode, the processing circuitry of the operation control apparatus may be configured to change the current operation mode to a normal mode of the set of at least two operation modes. Based on the current operation mode being the normal mode, the processing circuitry of the operation control apparatus may be configured to change the current operation mode to an advanced mode of the set of at least two operation modes. For example, based on the measured evaluation index not satisfying a preset second service requirement for safety, the processing circuitry of the operation control apparatus may be configured to change the operation mode to a lower level operation mode of the set of at least two operation modes, for example, to increase the safety of the operation of the service robot. In this example, based on the current operation mode being the advanced mode, the processing circuitry of the operation control apparatus may be configured to change the current operation mode to the normal mode of the set of at least two operation modes. Based on the current operation mode being the normal mode, the processing circuitry of the operation control apparatus may change the current operation mode to the safe mode of the set of at least two operation modes.

For another example, based on the service robot being determined to be stable or safe based on the measured evaluation index, the processing circuitry of the operation control apparatus may be configured to change the operation mode from the safe mode to the normal mode of the set of at least two operation modes, and/or from the normal mode to the advanced mode of the set of at least two operation modes. In this example, when any flaw or problem occurs while the service robot is operating in the normal mode or the advanced mode, the processing circuitry of the operation control apparatus may change the operation mode from the normal mode to the safe mode of the set of at least two operation modes or from the advanced mode to the normal mode of the set of at least two operation modes.

For example, based on a selection, for a same function, of a first rule-based behavior in the safe mode and/or a second rule-based behavior in the normal mode, and/or a selection of a training-based behavior in the advanced mode, the processing circuitry of the operation control apparatus may be configured to change a behavior of the service robot based on a change in operation mode in operation 740. For example, based on the operation mode changing from the safe mode to the normal mode, the processing circuitry of the operation control apparatus may be configured to change the behavior of the service robot from the first rule-based behavior to the second rule-based behavior. Based on the operation mode changing from the advanced mode to the normal mode, the processing circuitry of the operation control apparatus may be configured to change the behavior of the service robot from the training-based behavior to the second rule-based behavior. Such change in operation mode and behavior described above may occur in real time and/or while the service robot is providing a service.

Figure 8:
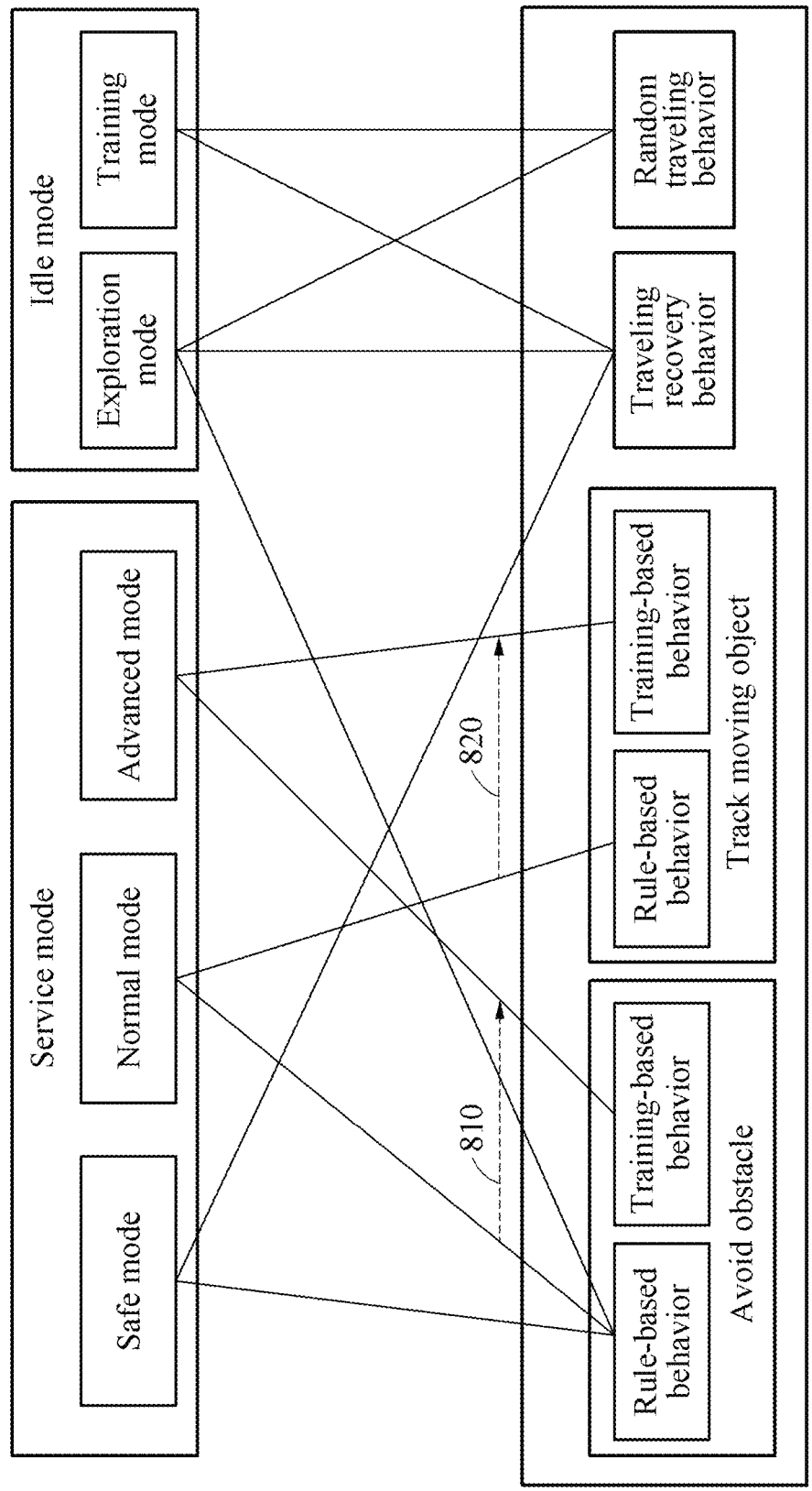
FIG. 8 is a diagram illustrating an example of a behavior of a service robot in each operation mode of the service robot according to at least one example embodiment.

FIG. 8 is a diagram illustrating an example of a behavior of a service robot in each operation mode of the service robot according to at least one example embodiment.

FIG. 8 illustrates an example of a service robot performing a service of tracking a moving object while avoiding an obstacle. According to at least one example embodiment, the service robot may operate in a service mode or in an idle mode, for example, based on what is selected by a user. The service mode may include an operation mode selected from a set of at least two operation modes, which may include, for example, a safe mode, a normal mode, and an advanced mode. The idle mode may include, for example, an exploration mode and a training mode. The safe mode may be an operation mode providing a high level of safety despite a relatively lower level of performance. The normal mode may be an operation mode providing an average level of performance, safety, and adaptability. The advanced mode may be an operation mode from which a highest level of performance is expected, although not ensuring safety and adaptability. The exploration mode may be an operation mode allowing the service robot to explore a space in which the service robot is located and collect spatial data of the space. The training mode may be an operation mode allowing the service robot to collect training data, for example, odometry data, to be used for training, and perform the training to improve performance of a training-based behavior. An operation mode of the service robot may be determined based on a service selected by the user and a recognized situation.

Each of the operation modes described above may correspond to at least one behavior selected from a set of at least two behaviors. For example, the set of at least two behaviors may include a rule-based behavior and a training-based behavior for performing an obstacle avoiding function, a rule-based behavior and a training-based behavior for performing a moving object tracking function, a traveling recovery behavior, and a random traveling behavior. A rule-based behavior may be a behavior determining an operation of the service robot based on a predefined rule, and a training-based behavior may be a behavior determining an operation of the service robot based on a rule determined through training. The traveling recovery behavior may be a behavior that is performed, when it is not possible for the service robot to travel in a current situation, to overcome such current situation and enable a situation in which it is possible for the service robot to travel. For example, when it is not possible for the service robot to travel by being confined, the traveling recovery behavior may allow the service robot to perform operations to escape from where the service robot is confined. The random traveling behavior may be a behavior performed by the service robot to collect training data while moving based on a randomly determined route or a traveling command.

In some example embodiments, processing circuitry of an operation control apparatus of the service robot may be configured to select a behavior from the set of at least two behaviors based on a function and/or an operation mode for a service situation. A function based on a service situation may include various functions, for example, a function of approaching a user, a function of leading a user, and a function of guiding a user, in addition to the obstacle avoiding function and the moving object tracking function. The set of at least two behaviors may include a plurality of behaviors for each function. For example, the set may include behaviors applicable to perform the obstacle avoiding function and behaviors applicable to perform the moving object tracking function, and the traveling recovery behavior, and the random traveling behavior.

In some example embodiments, processing circuitry of an operation control apparatus may be configured to change a service situation or an operation mode of the service robot based on time, and/or to change a behavior to be applied to the service robot. For example, based on the operation mode changing from the normal mode to the advanced mode while the service robot is performing the obstacle avoiding function, the processing circuitry of an operation control apparatus may be configured to change the behavior of the service robot from the rule-based behavior to the training-based behavior as indicated by an arrow 810. Similarly, based on the operation mode changing from the normal mode to the advanced mode while the service robot is performing the moving object tracking function, the processing circuitry of an operation control apparatus may be configured to change the behavior of the service robot from the rule-based behavior to the training-based behavior as indicated by an arrow 820.

According to at least one example embodiment, the service robot may provide a service by avoiding an obstacle or tracking a moving object based on the rule-based behavior in the normal mode. The rule-based behavior may provide an average level of performance, safety, and adaptability in some situations (e.g., most situations and/or typical situations). Based on a recognition of a dangerous situation or a potentially undesirable situation, the processing circuitry of an operation control apparatus may be configured to cause the service robot to operate in the safe mode, and/or to perform the obstacle avoiding function of the rule-based behavior. Herein, although the behaviors perform the same function, the rule-based behavior in the safe mode may have a characteristic that is different from that of the rule-based behavior in the normal mode. For example, regarding the obstacle avoiding function, the rule-based behavior in the safe mode may provide a higher level of safety compared to the rule-based behavior in the normal mode. Based on a measured evaluation index satisfying a preset service requirement while the service robot is operating in the normal mode, the processing circuitry of an operation control apparatus may be configured to change the normal mode of the service robot to the advanced mode. Based on the service robot operating in the advanced mode, the processing circuitry of an operation control apparatus may be configured to cause the service robot to operate according the training-based behavior while performing the obstacle avoiding function and the moving object tracking function. Based on the service robot being in the advanced mode, the processing circuitry of an operation control apparatus may be configured to cause the service robot to perform training (e.g., continuously) based on collected data.

Based on the service robot being in the exploration mode, the processing circuitry of an operation control apparatus may be configured to cause the service robot to operate according to the random traveling behavior, and the rule-based behavior that is applied when the service robot performs the obstacle avoiding function, based on a service situation. As another example, the service robot may set an optimal route for random traveling under the assumption that there is no obstacle in an initial stage, and operate according the random traveling behavior. Based on an obstacle being recognized as being present on the traveling route of a nearby environment recognized based on sensor data, the processing circuitry of an operation control apparatus may be configured to cause the service robot to operate according to the rule-based behavior to perform the obstacle avoiding function. As another example, based on the service robot being in the training mode, the processing circuitry of an operation control apparatus may be configured to cause the service robot to move according to the random traveling behavior to obtain data that is not previously learned or trained. The processing circuitry of an operation control apparatus may be configured to use the obtained data, for example, to train the training-based behavior for the obstacle avoiding function and/or the moving object tracking function.

Through such operations described above, the processing circuitry of an operation control apparatus may be configured to cause the service robot to improve performance (e.g., continuously) and/or to stably provide a service in various situations.

Figure 9:
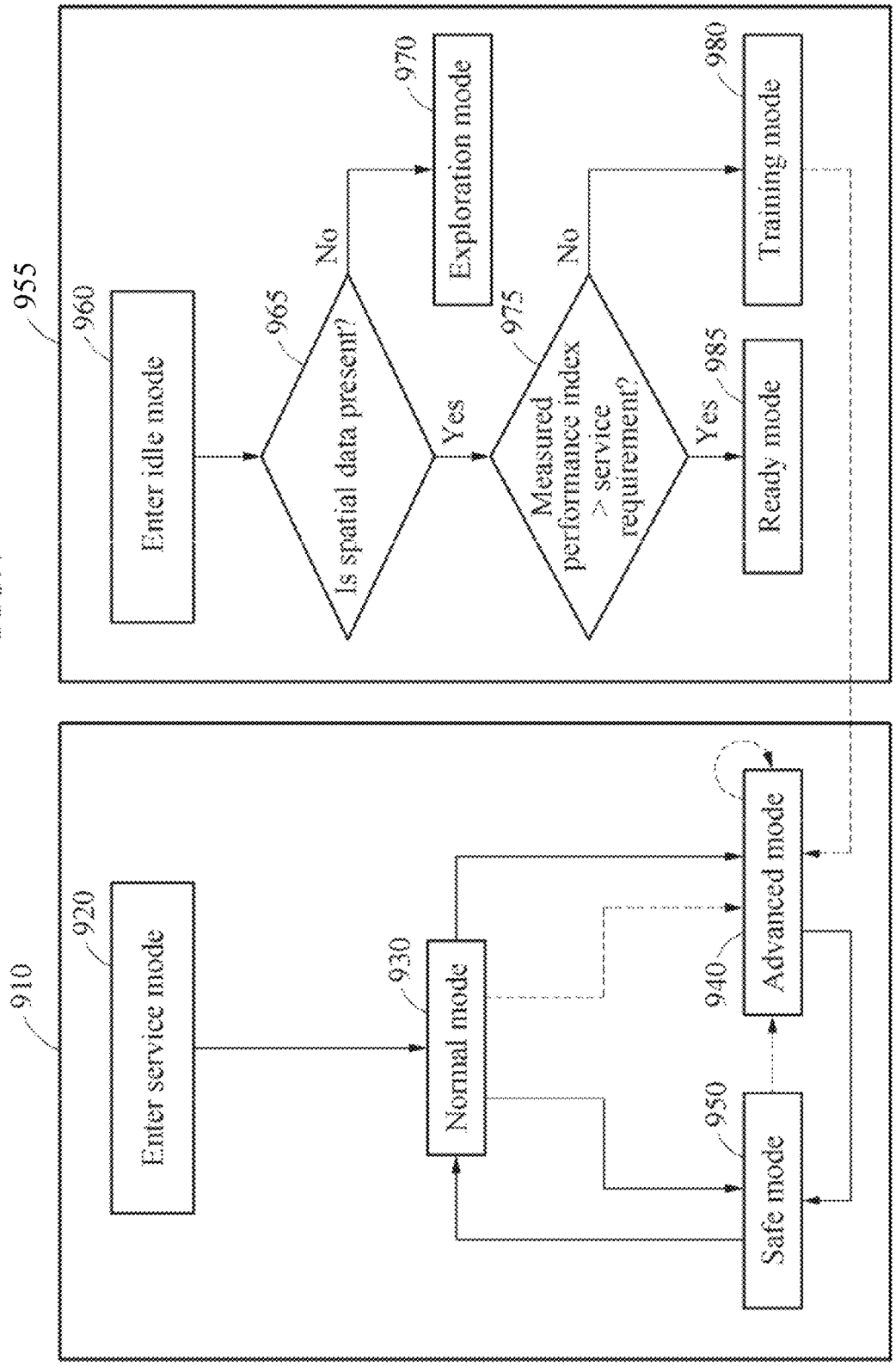
FIG. 9 is a flowchart illustrating an example of how an operation mode of a service robot is determined according to at least one example embodiment.

FIG. 9 is a flowchart illustrating an example of determining an operation mode of a service robot according to at least one example embodiment, including an example 910 of determining an operation mode of a service robot in a service mode and an example 955 of determining an operation mode of the service robot in an idle mode.

In the example 910 of FIG. 9, based on the service robot entering a service mode 920, the processing circuitry of an operation control apparatus measures an evaluation index based on sensor data. The processing circuitry of the operation control apparatus may be configured to determine an operation mode of the service robot based on the measured evaluation index and an operation mode change condition predefined based on a service situation (for example, by comparing the measured evaluation index to the operation mode change condition). The service robot operates initially in a normal mode 930. Based on the evaluation index satisfying a service requirement for adjusting upwards, or upgrading, the operation mode, the processing circuitry of the operation control apparatus may be configured to change the operation mode of the service robot to an advanced mode 940 of the set of at least two operation modes. The processing circuitry of the operation control apparatus may be configured to select an operation mode from the set of at least two operation modes that may provide a highest level of performance in a current situation. For example, based on the current situation being a situation without any problem in terms of safety or adaptability, the processing circuitry of the operation control apparatus may be configured to determine the operation mode of the service robot to be the normal mode 930 in lieu of a safe mode 950, or the advanced mode 940 in lieu of the normal mode 930, which may improve the performance of the service robot in some scenarios. As another example, based on a problem in terms of safety or adaptability while the service robot is operating, the processing circuitry of the operation control apparatus may be configured to adjust downwards, or downgrade, the operation mode of the service robot to a different operation mode of the set of at least two operation modes. Here, based on the current operation mode of the service robot being the advanced mode 940, the processing circuitry of the operation control apparatus may be configured to change the current operation mode of the service robot to the normal mode 930 of the set of at least two operation modes. As another example, based on the current operation mode being the normal mode 930, the processing circuitry of the operation control apparatus may be configured to change the current operation mode to the safe mode 950 of the set of at least two operations. Based on a measured evaluation index satisfies a service requirement predefined for each service situation, for example, a required performance index, a required safety index, and a required adaptability index, and after a downward adjustment or downgrade of the operation mode, the processing circuitry of the operation control apparatus may be configured to upgrade the operation mode.

In the example of 955 of FIG. 9, based on the service robot entering an idle mode 960, the processing circuitry of the operation control apparatus determines whether or not spatial data of a space in which the service robot is located is present in operation 965. Based on the spatial data not being present, the processing circuitry of the operation control apparatus may be configured to determine the operation mode of the service robot to be an exploration mode 970 of the set of at least two operation modes. Based on the service robot operates in the exploration mode 970, the processing circuitry of the operation control apparatus may be configured to cause the service robot to collect data while exploring an area around the service robot. Based on the exploration being terminated, the processing circuitry of the operation control apparatus may be configured to change the operating mode the service robot to a training mode 980 of the set of at least two operating modes and/or to perform training based on previously collected data.

Based on the spatial data is present, the processing circuitry of the operation control apparatus may be configured to determine whether or not a measured performance index satisfies the service requirement in operation 975. Based on the measured performance index satisfying the service requirement, the processing circuitry of the operation control apparatus may be configured to set the service robot to be in a ready operation mode 985. Based on the measured performance index not satisfying the service requirement, the processing circuitry of the operation control apparatus may be configured to determine the operation mode of the service robot, from the set of at least two operation modes, to be a training mode 980. Based on the service robot being in the training mode 980, the service robot may collect data for training and or perform the training based on the collected data. The training may include correcting parameters defining an advanced mode 940 and/or a behavior corresponding to the advanced mode 940.

Figure 10:
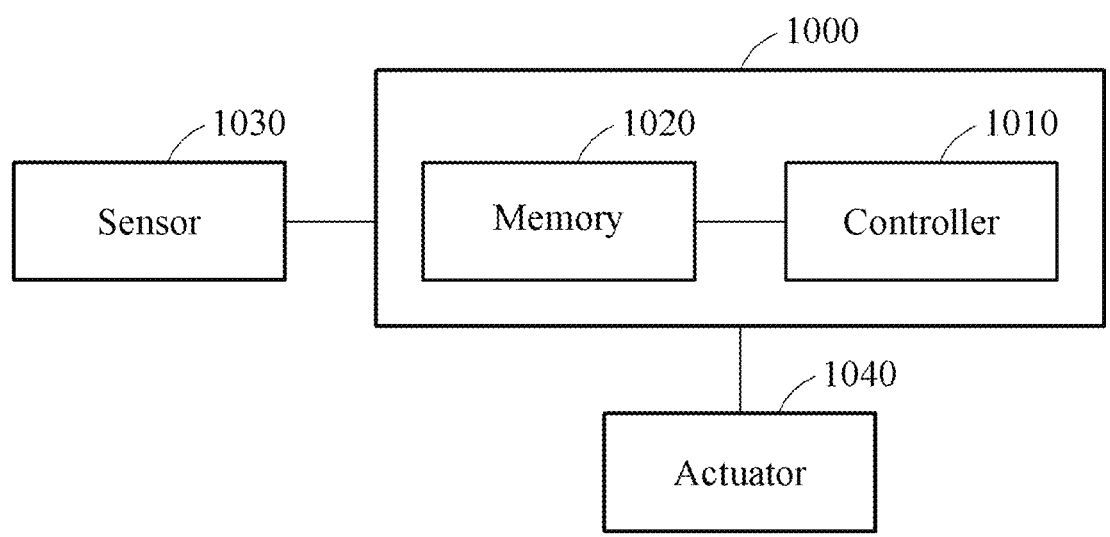
FIG. 10 is a diagram illustrating a configuration of an operation control apparatus of a service robot according to at least one example embodiment.

FIG. 10 is a diagram illustrating a configuration of an operation control apparatus for controlling an operation of a service robot according to at least one example embodiment.

Referring to FIG. 10. an operation control apparatus 1000 includes a memory 1020 and a controller 1010. The controller 1010 may include processing circuitry, as discussed herein.

The memory 1020 may be connected to the controller 1010, and may be configured to store instructions to be executed by the controller 1010 and/or data, which may be processed by the controller 1010 and/or stored for processing by the controller 1010. The memory 1020 may include, for example, a non-transitory computer-readable medium, for example, a high-speed random access memory (RAM) and a nonvolatile computer-readable storage medium (e.g., at least one disk storage device, flash memory device, and other nonvolatile solid state memory devices).

The controller 1010 may include at least one processor, and control an overall operation of the operation control apparatus 1000. In addition, the controller 1010 may control an operation of a service robot by controlling an actuator 1040 configured to actuate or drive the service robot.

The controller 1010 may perform at least one of the operations described above with reference to FIGS. 1 through 9 by executing the instructions stored in the memory 1020. For example, the controller 1010 may recognize a situation based on sensor data obtained by a sensor 1030 in a service mode, and measure an evaluation index. The sensor 1030 may include any sensors that may obtain environment information of the service robot, for example, a camera, a distance sensor, a detector, a depth sensor, a GPS sensor, a microphone, a LiDAR sensor, a motor encoder sensor, an infrared sensor, an IMU, an odometer sensor, and the like.

The controller 1010 may determine an operation mode of the service robot based on the measured evaluation index, and select a behavior to be applied to an operation of the service robot from at least one behavior based on the determined operation mode. For example, the controller 1010 may select one behavior from at least one behavior associated with a function to be performed by the service robot, and control an operation of the service robot based on the selected behavior. When the measured evaluation index satisfies a preset operation mode change condition, the controller 1010 may change a current operation mode of the service robot to another operation mode.

The processing circuitry of the controller 1010 may also be configured to determine an operation mode of the service robot in an idle mode based on whether spatial data of a space in which the service robot is located when being in the idle mode is present or not. Based on the spatial data not being present, the processing circuitry of the controller 1010 may determine the operation mode of the service robot to be an exploration mode. When, although the spatial data is present, the measured evaluation index may not satisfy a preset condition, the controller 1010 may be configured to determine the operation mode of the service robot, determined from the set of at least two operation modes, to be a training mode. Based on the operation mode of the service robot being determined as described above, a behavior of the service robot corresponding to the determined operation mode may be selected from the at least one behavior.

In some example embodiments, an operation control method as described herein may also be applied to control operations of other robots in addition to the service robot.

In some example embodiments, units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

In some example embodiments, the software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

In some example embodiments, a method according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling an operation of a service robot, comprising:
    measuring, by processing circuitry, an evaluation index indicating a value that numerically represents a result of evaluation performed on an operation of the service robot based on sensor data in a service mode, the measuring of the evaluation index including measuring, by the processing circuitry, a performance index indicating a speed and accuracy of the service robot, a safety index indicating a level of safety of the service robot, based the sensor data, wherein the performance index is determined based on an average function performing speed and a maximum speed of the service robot, the safety index is determined based on a number of collisions while performing a function of the service robot and a speed at a time of collision, and the adaptability index is determined based on a number of context recognitions and a number of situational response strategies;
    determining, by the processing circuitry, an operation mode of the service robot from a set of at least two operation modes based on the evaluation index, the determining of the operation mode including,
        changing, by the processing circuitry, a current operation mode of the service robot to a higher level operation mode than the current operation mode, in response to the performance index, the safety index and the adaptability index satisfying a preset first service requirement; and changing, by the processing circuitry, the current operation mode of the service robot a lower level operation mode than the current operation mode, in response to the performance index, the safety index and the adaptability index failing to satisfy a preset second service requirement;

selecting, by the processing circuitry, a behavior defining a detailed operation strategy of the service robot to be applied to the operation of the service robot from a set of at least two behaviors based on the determined operation mode and the evaluation index, wherein the set of at least two behaviors including rule-based behaviors in which the service robot is controlled using pre-defined rules and a training-based behavior in which the service robot is controlled using adaptive rules; and controlling, by the processing circuitry, the operation of the service robot based on the selected behavior, wherein the selecting of the behavior, comprising:
selecting the training-based behavior to control the service robot based on the adaptive rules, in response to the current operation mode of the service robot being changed to the higher level operation mode than the current operation mode; and selecting the rule-based behaviors to control the service robot based on the pre-defined rules, in response to the current operation mode of the service robot being changed the lower level operation mode than the current operation mode.

2. The method of claim 1, wherein the determining of the operation mode comprises:
recognizing, by the processing circuitry, a current service situation based on the sensor data; and
determining, by the processing circuitry, the operation mode from the set of at least two operation modes based on the current service situation and the evaluation index.

3. The method of claim 1, wherein the selecting of the behavior comprises:
selecting, by the processing circuitry, the behavior from the set of at least two behaviors that are respectively associated with a function to be performed by the service robot based on the operation mode.

4. The method of claim 1, wherein the selecting of the behavior comprises:
selecting, by the processing circuitry, a first one of the rule-based behaviors from the set of at least two behaviors based on the operation mode being determined to be a first operation mode;
selecting, by the processing circuitry, a second one of the rule-based behaviors from the set of at least two behaviors based on the operation mode being determined to be a second operation mode; and
selecting, by the processing circuitry, the training-based behavior from the set of at least two behaviors based on the operation mode being determined to be a third operation mode.

5. The method of claim 1, further comprising:
determining, by the processing circuitry, the operation mode of the service robot from the set of at least two operation modes to be an idle mode based on whether or not spatial data of a space in which the service robot is located is present in the idle mode.

6. The method of claim 5, wherein
the determining of the operation mode in the idle mode comprises: determining, by the processing circuitry, the operation mode of the service robot from the set of at least two operation modes to be an exploration mode based on the spatial data not being present, and
the service robot is further configured to explore the space in which the service robot is located based the determining of the exploration mode.

7. The method of claim 5, wherein the determining of the operation mode in the idle mode comprises:
determining, by the processing circuitry, the operation mode of the service robot from the set of at least two operation modes to be a training mode based on the spatial data being present and the evaluation index not satisfying a preset condition.

8. The method of claim 7, wherein the service robot is configured to correct parameters defining a training-based behavior of the set of at least two behaviors based on the determining of the training mode and collected traveling data.

9. A non-transitory computer-readable medium comprising computer readable instructions to cause the processing circuitry to perform the method of claim 1.

10. An apparatus for controlling an operation of a service robot, comprising:
a memory; and
a controller comprising processing circuitry configured to control the operation of the service robot by,
measuring an evaluation index indicating a value that numerically represents a result of evaluation performed on an operation of the service robot based on sensor data in a service mode by measuring a performance index indicating a speed and accuracy of the service robot, a safety index indicating a level of safety of the service robot, and an adaptability index indicating a level of adaptability of the service robot, based on sensor data, wherein the performance index is determined based on an average function performing speed and a maximum speed of the service robot, the safety index is determined based on a number of collisions while performing a function of the service robot and a speed at a time of collision, and the adaptability index is determined based on a number of context recognitions and a number of situational response strategies,
determining an operation mode of the service robot from a set of at least two operation modes based on the evaluation index by,
changing a current operation mode of the service robot to a higher level operation mode than the current operation mode, in response to the performance index, the safety index and the adaptability index satisfying a preset first service requirement; and
changing the current operation mode of the service robot a lower level operation mode than the current operation mode, in response to the performance index, the safety index and the adaptability index failing to satisfy a preset second service requirement,
selecting a behavior defining a detailed operation strategy of the service robot to be applied to the operation of the service robot from a set of at least two behaviors based on the determined operation mode and the evaluation index, wherein the set of at least two behaviors including rule-based behaviors in which the service robot is controlled using pre-defined rules and a training-based behavior in which the service robot is controlled using adaptive rules, and controlling the operation of the service robot based on the selected behavior, wherein the controller is configured to:
select the training-based behavior to control the service robot based on the adaptive rules, in response to the current operation mode of the service robot being changed to the higher level operation mode than the current operation mode; and select the rule-based behaviors to control the service robot based on the pre-defined rules, in response to the current operation mode of the service robot being changed the lower level operation mode than the current operation mode.

11. The apparatus of claim 10, wherein the controller is configured to:
select the behavior from the set of at least two behaviors that are respectively associated with a function to be performed by the service robot based on the operation mode.

12. The apparatus of claim 10, wherein the controller is configured to:
select a first one of the rule-based behaviors from the set of at least two behaviors based on the operation mode being determined to be a first operation mode;

select a second one of the rule-based behaviors from the set of at least two behaviors based on the operation mode being determined to be a second operation mode; and select the training-based behavior from the set of at least two behaviors based on the operation mode being determined to be a third operation mode.

13. The apparatus of claim 10, wherein the controller is configured to:
determine the operation mode of the service robot from the set of at least two operation modes to be an idle mode from the set of at least two operation modes based on whether or not spatial data of a space in which the service robot is located is present in the idle mode.

14. The apparatus of claim 13, wherein the controller is configured to:
determine the operation mode of the service robot from the set of at least two operation modes to be an exploration mode based on the spatial data not being present, and control the service robot to explore the space in which the service robot is located in the exploration mode.

* * * * *